(12) United States Patent
Miura et al.

(10) Patent No.: US 10,174,236 B2
(45) Date of Patent: Jan. 8, 2019

(54) HEAT STORAGE MATERIAL COMPOSITION

(71) Applicant: Sumitomo Chemical Company, Limited, Tokyo (JP)

(72) Inventors: Yu Miura, Chiba (JP); Nobuhiro Oosaki, Osaka (JP); Yoshinobu Nozue, Tokyo (JP)

(73) Assignee: Sumitomo Chemical Company, Limited, Tokyo (JP)

(*) Notice: Subject to any disclaimer, the term of this patent is extended or adjusted under 35 U.S.C. 154(b) by 127 days.

(21) Appl. No.: 15/126,315

(22) PCT Filed: Mar. 19, 2015

(86) PCT No.: PCT/JP2015/059277
§ 371 (c)(1),
(2) Date: Sep. 15, 2016

(87) PCT Pub. No.: WO2015/141866
PCT Pub. Date: Sep. 24, 2015

(65) Prior Publication Data
US 2017/0088761 A1 Mar. 30, 2017

(30) Foreign Application Priority Data
Mar. 20, 2014 (JP) .................. 2014-057621

(51) Int. Cl.
| C09K 5/08 | (2006.01) |
| C09K 5/06 | (2006.01) |
| C08L 29/04 | (2006.01) |
| C08L 31/04 | (2006.01) |
| C08L 77/02 | (2006.01) |
| C09K 5/14 | (2006.01) |

(52) U.S. Cl.
CPC .............. *C09K 5/063* (2013.01); *C08L 29/04* (2013.01); *C08L 31/04* (2013.01); *C08L 77/02* (2013.01); *C09K 5/14* (2013.01)

(58) Field of Classification Search
CPC .................................. C09K 5/063; C09K 5/08
USPC ......................................................... 252/70
See application file for complete search history.

(56) References Cited

U.S. PATENT DOCUMENTS

| 2,290,600 | A | * | 7/1942 | Neher | C08J 5/18 |
| | | | | | 525/60 |
| 4,259,198 | A | * | 3/1981 | Kreibich | C08L 63/00 |
| | | | | | 126/400 |
| 4,774,395 | A | | 9/1988 | Yabuuchi et al. | |
| 4,795,580 | A | | 1/1989 | Hormansdorfer | |
| 5,077,336 | A | * | 12/1991 | Nakashita | C08L 27/06 |
| | | | | | 524/17 |
| 5,718,835 | A | * | 2/1998 | Momose | C09K 5/063 |
| | | | | | 106/271 |
| 5,785,885 | A | * | 7/1998 | Kakiuchi | C09K 5/066 |
| | | | | | 252/70 |
| 5,798,407 | A | * | 8/1998 | Yano | C08L 23/06 |
| | | | | | 524/504 |
| 5,916,477 | A | * | 6/1999 | Kakiuchi | C09K 5/063 |
| | | | | | 165/104.11 |
| 6,200,681 | B1 | | 3/2001 | Jahns et al. | |
| 7,842,750 | B2 | * | 11/2010 | Reezigt | C09K 5/063 |
| | | | | | 524/556 |
| 8,045,846 | B2 | * | 10/2011 | Amano | C09K 5/063 |
| | | | | | 392/339 |
| 2002/0161088 | A1 | * | 10/2002 | Kochvar | B01J 13/04 |
| | | | | | 524/379 |
| 2009/0283940 | A1 | | 11/2009 | Oosaki et al. | |
| 2010/0015430 | A1 | * | 1/2010 | Hartmann | B32B 7/02 |
| | | | | | 428/323 |
| 2010/0264353 | A1 | * | 10/2010 | Hartmann | C08B 15/02 |
| | | | | | 252/62 |
| 2013/0228308 | A1 | * | 9/2013 | Abhari | C09K 5/063 |
| | | | | | 165/104.17 |
| 2015/0203734 | A1 | * | 7/2015 | Kanae | C09K 5/063 |
| | | | | | 252/79 |
| 2018/0094872 | A1 | * | 4/2018 | Fujisaki | B32B 27/18 |
| 2018/0094973 | A1 | * | 4/2018 | Sarafianos | G01J 1/44 |

FOREIGN PATENT DOCUMENTS

| CN | 101522413 A | 9/2009 |
| EP | 2620211 A2 | 7/2013 |
| JP | S61174290 A | 8/1986 |
| JP | S63500946 A | 4/1988 |
| JP | H0532963 A | 2/1993 |
| JP | 2000038576 A | 2/2000 |
| JP | 2001152141 A | 6/2001 |
| JP | 2002105442 A | 4/2002 |
| JP | 2005098677 A | 4/2005 |

OTHER PUBLICATIONS

Int'l Search Report dated Apr. 21, 2015 in Int'l Application No. PCT/JP2015/059277.

(Continued)

*Primary Examiner* — Jane L Stanley
(74) *Attorney, Agent, or Firm* — Panitch Schwarze Belisario & Nadel LLP

(57) ABSTRACT

A heat storage material composition that is excellent in shape retention and bleed resistance is provided. The heat storage material composition is obtained by heat-treating Component (A), Polymer (B-1) and Polymer (B-2) together. Component (A) is a polyhydric alcohol not having constitutional units derived from any vinyl monomers. Polymer (B-1) is a polymer composed mainly of constitutional units derived from acrylic acid or a salt thereof, a polymer composed mainly of constitutional units derived from methacrylic acid or a salt thereof, or a mixture thereof, excluding a polymer having two or more hydroxy groups in one polymer chain. Polymer (B-2) is a polymer composed mainly of constitutional units derived from a vinyl monomer, and having two or more hydroxy groups in one polymer chain.

7 Claims, No Drawings

(56) References Cited

OTHER PUBLICATIONS

Int'l Preliminary Report on Patentability dated Sep. 20, 2016 in Int'l Application No. PCT/JP2015/059277.
Extended European Search Report dated Oct. 10, 2017 in EP Application No. 15764784.3.
Jain et al., "Designing Polyethylene Glycol (PEG)—Plasticized Membranes of Poly(vinyl alcohol-g-methyl methacrylate) and Investigation of Water Sorption and Blood Compatibility Behaviors", Designed Monomers and Polymers, vol. 16, No. 5, pp. 436-446 (2013).
Office Action dated Aug. 8, 2018 in CN Application No. 201580014237.8.
Office Action dated Aug. 29, 2018 in EP Application No. 15764784.3.

\* cited by examiner

HEAT STORAGE MATERIAL COMPOSITION

CROSS-REFERENCE TO RELATED APPLICATION

This application is a Section 371 of International Application No. PCT/JP2015/059277, filed Mar. 19, 2015, which was published in the Japanese language on Sep. 24, 2015, under International Publication No. WO 2015/141866 A1, and the disclosure of which is incorporated herein by reference.

TECHNICAL FIELD

The present invention is related to beat storage material compositions. Heat storage material compositions are compositions comprising a heat, storage material, which is a material having heat storage ability, and a matrix compound substantially incapable of storing heat.

BACKGROUND ART

In the recent years, attention has been paid to the technology of storing heat energy, i.e. heat storage technology, as one of the technologies to solve the recent energy problems. Heat storage technology is a technology to effectively utilize natural energy such as solar heat and geothermal heat, and residual heat from air-conditioners; for example, in houses, heat storage technology is used as a technology involving storing heat by use of inexpensive nighttime electric power, and using the stored heat as a multi-purpose heat source, thereby reducing mid-day power consumption.

For example, Patent Document 1 discloses a heat storage material composed mainly of a polyhydric aliphatic alcohol having an isomeric arrangement such as that having symmetric arrangement with respect to the center of the chain, and employing mannitol and/or the like as the polyhydric aliphatic alcohol.

Further, Patent Document 2 discloses a heat storage material composed mainly of a sugar alcohol selected from the group consisting of erythritol, mannitol and galactitol, and utilizing the latent heat of fusion of such compounds.

Further, Patent Document 3 discloses a composition comprising a heat storage material that is prepared by the blend of a urea compound into an organic compound being solid at normal temperature and having a solid phase transition point and that employs trimethylolmethane, pentaerythritol or the like as that organic compound, and use of the composition comprising the heat storage material for heat supply utilizing latent heat of fusion.

[Patent Document 1] JP-A-63-500946
[Patent Document 2] JP-A-5-32963
[Patent Document 3] JP-A-2001-152141

SUMMARY OF THE INVENTION

Problem to be Solved by the Invention

As the shape of the heat storage materials and the heat storage material compositions as described in the aforementioned patent documents varies with the phase transition and melting of the heat storage material, the heat storage materials and the heat storage material compositions, when in use, were sealed in a container capable of retaining their shapes and preventing their leakage.

Given the situation, the heat storage technology is expected to find much broader applications if there become available heat storage material compositions involving smaller changes in shape caused by the phase transfer or the melting and resulting in reduced leakage of heat storage materials and they can be used with a light-weight and flexible container or even without any container at all.

In order to solve this problem, the object of the present invention is to provide a heat storage material composition having excellent shape retention and bleed resistance.

Means for Solving the Problem

Namely, the present invention is related to a heat storage material composition obtained by heat-treating Component (A) being a polyhydric alcohol not having constitutional units derived from any vinyl monomers, the following polymer (B-1) and the following polymer (B-2) together.

Polymer (B-1): A polymer composed mainly of constitutional units derived from acrylic acid or a salt thereof, a polymer composed mainly of constitutional units derived from methacrylic acid or a salt thereof, or a mixture thereof, excluding a polymer having two or more hydroxy groups in one polymer chain.

Polymer (B-2): A polymer composed mainly of constitutional units derived from a vinyl monomer, and having two or more hydroxy groups in one polymer chain.

Effect of the Invention

According to the present invention, it is possible to provide a heat storage material composition having excellent shape retention and bleed resistance.

DESCRIPTION OF THE INVENTION

[Polyhydric Alcohol (Component (A))]

The polyhydric alcohol of Component (A) is an alcohol having two or more hydroxyl groups in its single molecule. The molecular weight of the polyhydric alcohol is preferably 800 or less, and more preferably not less than 50 and not more than 800. In the heat storage material composition of the present invention, Component (A) is a heat storage material.

Depending on the intended operating temperature range of the heat storage material composition, one polyhydric alcohol may be used singly, or two or more polyhydric alcohols may be used in combination.

Examples of the polyhydric alcohol include ethylene glycol, diethylene glycol, propylene glycol, dipropylene glycol, trimethylene glycol, 1,3-butanediol, 1,4-butanediol, 2,3-butanediol, 1,3-tetramethylenediol, 1,4-tetramethylenediol, 1,6-hexanediol, 1,3-tetramethylenediol, 2-methyl-1,3-trimethylenediol, 1,5-pentamethylenediol, trimethylpentanediol, 2,2,4-trimethyl-1,3-pentanediol, neopentyl glycol, cyclohexanediol, 2-butyl-2-ethyl-1,3-propanediol, 1,6-hexamethylenediol, 3-methyl-1,5-pentamethylenediol, 2,4-diethyl-1,5-pentamethylenediol, 1,8-octanediol, 1,9-nonanediol, 1,10-decanediol, meta-xylene glycol, para-xylene glycol, bis-hydroxyethoxybenzene, bis-hydroxyethyl terephthalate, glycerin, diglycerin, trimethylolpropane, ditrimethylolpropane, trimethylolethane, cyclohexanediol (1,4-cyclohexanediol, cyclohexane dimethanol, etc.), bis-phenols (such as bisphenol A), sugar alcohols (such as xylitol and sorbitol), pentaerythritol, dipentaerythritol, 2-methylolpropanediol, and ethoxylated trimethylolpropane.

Such polyhydric alcohols also include compounds having functional groups other than the alcoholic hydroxy group, such as a carboxy group, a sulfo group, a carboxylic acid anhydride group, an alkoxycarbonyl group, a haloformyl group, a carbamoyl group, a cyano group, a formyl group, a mercapto group, an amino group, and an imino group, in a single molecule.

Among the aforementioned polyhydric alcohols, compounds which exhibit solid phase-solid phase transition such as pentaerythritol, trimethylol ethane, and neopentyl glycol are preferable from the viewpoint of suppressing the shape change before and after the phase transition. These compounds are generally represented by the following formula (1).

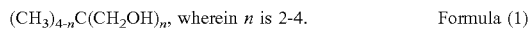

$(CH_3)_{4-n}C(CH_2OH)_n$, wherein $n$ is 2-4.  Formula (1)

In addition to the compound represented by the formula (1), trimethylol amino ethane is preferable as the polyhydric alcohol which exhibits solid phase-solid phase transition.

Further, among the polyhydric alcohols, those having a linear hydrocarbon chain structure and one hydroxy group per carbon atom, such as erythritol, threitol, xylitol, dulcitol, allitol, and mannitol, are organic materials having high latent heat (i.e. heat of fusion), and such polyhydric alcohols can also be used from the viewpoint of enhancing the performance of the heat storage material. These compounds are generally represented by the following formula (2).

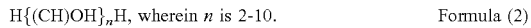

$H\{(CH)OH\}_nH$, wherein $n$ is 2-10.  Formula (2)

Polymer (B-1) is a polymer composed mainly of constitutional units derived from acrylic acid or a salt thereof, a polymer mainly composed of constitutional units derived from methacrylic acid or a salt thereof, or a mixture thereof, excluding any polymer having two or more hydroxy groups in one polymer chain. Herein, "composed mainly of" means that the number of constitutional units derived from (meth) acrylic acid or a salt thereof exceeds 50 units per 100 units of the number of constitutional units in the polymer chain. Specifically, examples include polyacrylic acid and homopolymers of a salt of acrylic acid, and polymethacrylic acid and homopolymers of a salt of methacrylic acid. Among these, polyacrylic acid or polymethacrylic acid, which produce water molecules by reacting with hydroxyl groups, is preferable. The weight average molecular weight of the Polymer (B-1) is preferably not less than 1,000, and more preferably not less than 1,000 and not more than 10 million.

Polymer (B-2) is a polymer composed mainly of constitutional units derived from a vinyl monomer, and having two or more hydroxy groups in one polymer chain.

Such polymers include polyvinyl alcohol, saponified ethylene-vinyl acetate copolymers, homopolymers or copolymers of acrylates, such as 2-hydroxyethyl acrylate, 2-hydroxypropyl acrylate, 3-hydroxypropyl acrylate, 2-hydroxybutyl acrylate, and 4-hydroxybutyl acrylate, homopolymers or copolymers of methacrylates, such as 2-hydroxyethyl methacrylate, 2-hydroxypropyl methacrylate, 3-hydroxypropyl methacrylate, 2-hydroxybutyl methacrylate, and 4-hydroxybutyl methacrylate, polyethylene glycol, polypropylene glycol, polybutylene glycol, etc.

Among these, polyvinyl alcohol, homopolymers or copolymers of acrylates, and homopolymers or copolymers of methacrylates are preferable from a viewpoint of improving shape retention and bleed resistance by forming a cross-linked structure enough.

Further, among these, polyvinyl alcohol, which forms a dense cross-linked structure with the Polymer (B-1), is particularly preferable. The weight average molecular weight of the Polymer (B-2) is preferably not less than 1,000, and more preferably not less than 1,000 and not more than 10 million.

The method of synthesizing the Polymer (B-1) or the Polymer (B-2) may be known bulk polymerization, solution polymerization, dispersion polymerization, redox polymerization or the like, and if necessary, an initiator, a chain transfer agent, etc. or other additives may be added to a polymerization solution containing monomer components. For example, it is possible to obtain the Polymer (B-1) or the Polymer (B-2) by subjecting the aforementioned monomer component to solution polymerisation in the presence of a radical polymerization initiator such as known peroxides and azo compounds.

The amount of the Polymer (B-1) to be subjected to the heat-treatment is 0.1 to 40 parts by weight, and the amount of Polymer (B-2) to be subjected, to the heat-treatment is 0.1 to 40 parts by weight with respect to a total of 100 parts by weight of the Component (A), the Polymer (B-1) and the Polymer (B-2) to be subjected to the heat-treatment. Excellent shape retention and sufficient performance of a heat storage material can be obtained by bringing the amount of the Polymer (B-1) and the amount of the Polymer (B-2) within the aforementioned ranges, respectively. The amount of the Polymer (B-1) to be subjected to the heat-treatment is preferably 0.5 to 20 parts by weight, and more preferably 1 to 10 parts by weight. The amount of the Polymer (B-2) to be subjected to the heat-treatment is preferably 0.5 to 20 parts by weight, and more preferably 1 to 10 parts by weight.

Moreover, from the viewpoint of improving shape retention and bleed resistance by forming a satisfactory cross-linking structure between the Polymer (B-1) and the Polymer (B-2), the weight ratio (B-1/B-2) of the Polymer (B-1) and the Polymer (B-2) to be subjected to the heat-treatment is preferably 10/1 to 1/10.

In addition to the Component (A), the Polymer (B-1) and the Polymer (B-2), a thermoplastic resin (Component (C)) can be added, if necessary. The addition, of the Component (C) can enhance the processability of the heat storage material composition. The addition of the Component (C) may be carried out before or during the heat-treatment of the Component (A), the Polymer (B-1) and the Polymer (B-2), or alternatively may be carried out after the heat-treatment.

Examples of such a thermoplastic resin include the following polymers (1) to (7) obtained by chain polymerization, the following polymers (8) to (11) obtained by successive polymerization, and the following polymer (12).

(1) Homopolymers of vinyl acetate, or α-olefin (e.g., ethylene and propylene)-vinyl acetate copolymers.

(2) Homopolymers of acrylate such as methyl acrylate, ethyl acrylate, propyl acrylate, and butyl acrylate, or α-olefin-acrylate copolymers.

(3) Homopolymers of methacrylates such as methyl methacrylate, ethyl methacrylate, propyl methacrylate, and butyl methacrylate, or α-olefin-methacrylate copolymers.

(4) Homopolymers of acrylonitrile, or copolymers of α-olefin and acrylonitrile.

(5) Homopolymers of vinyl chloride or vinylidene chloride, α-olefin-vinyl chloride copolymers, or α-olefin-vinylidene chloride copolymers.

(6) Homopolymers of styrene or α-methylstyrene, α-olefin-styrene copolymers, or α-olefin α-styrene copolymers.

(7) High-impact polystyrene, styrene-acrylonitrile copolymers, acrylonitrile-butadiene-styrene copolymers, acrylonitrile-ethylene-styrene copolymers, acrylonitrile-styrene-acrylate copolymers, and chlorinated polyethylene-acrylonitrile-styrene copolymers.

(8) Polyesters such as polyethylene terephthalate, polytrimethylene terephthalate, polybutylene terephthalate, polyethylene naphthalate, polybutylene naphthalate, and polylactic acid.
(9) Polycarbonates.
(10) Polyamides such as nylon 6, nylon 11, nylon 12, nylon 66, nylon 610, nylon 6T, and nylon 6I.
(11) Polyamideimides, polyether imides, polyimides, polyurethanes.
(12) Cellulose derivatives such as acetylcellulose.

The amount of the thermoplastic resin (Component (C)) added is 0.1 to 100 parts by weight with respect to a total of 100 parts by weight of the polyhydric alcohol (Component (A)), the Polymer (B-1) and the Polymer (B-2) before the heat-treatment. From the viewpoint of enhancing the processability of the heat storage material composition and from the viewpoint of enhancing the performance of the heat storage material, the amount of the Component (C) added is preferably 1 to 40 parts by weight, and more preferably 2 to 20 parts by weight.

The heat-treatment of the Component (A), the Polymer (B-1) and the Polymer (B-2) is carried out, for example, by heating the mixture containing the Component (A), the Polymer (B-1) and the Polymer (B-2) in an oven at a prescribed temperature higher than room temperature and then holding it there for a prescribed time, or by heating and kneading the mixture in a melt-kneader. It is believed that by this heat-treatment, the reaction between the Polymer (B-1) and the Polymer (B-2) takes place.

The heat storage material composition of the present invention is molded into various molded articles by an apparatus which is generally used for molding thermoplastics. Examples of the aforementioned apparatus include an injection molding machine, an extruder, a calendering machine, and a blow-molding machine.

A preferred method for manufacturing the heat storage material composition of the present invention is a method that involves mixing Component (A), Polymer (B-1), Polymer (B-2) and, if necessary. Component (C) beforehand, and reacting the Polymer (B-1) and the Polymer (B-2) by heat-treatment, thereby obtaining a heat storage material composition.

In particular, firstly, the Component (A), the Polymer (B-1), the Polymer (B-2) and, if necessary, the Component (C) are mixed uniformly and the Component (A), the Polymer (B-1), the Polymer (B-2), and the Component (C), mixed if necessary, are brought into a compatible state. Then, the Polymer (B-1) and the Polymer (B-2) were reacted by heat-treatment. The Polymer (B-1) and the Polymer (B-2) are reacted to form a densely intricate three-dimensional cross-linked structure composed of the Polymer (B-1) and the Polymer (B-2), and a state in which the Component-(A) and the Component (C), mixed if necessary, are supported on the three-dimensional cross-linked structure is established, so that a heat storage material composition is obtained.

The reaction temperature at which the Polymer (B-1) and the Polymer (B-2) are reacted by heat-treatment is preferably near the melting point of the Component (A). From the viewpoint of allowing the reaction to proceed sufficiently, the specific reaction temperature is usually about 100° C. to about 200° C. By reacting the polymers at or above the melting point of the Component (A), the Component (A), the Polymer (B-1) and the Polymer (B-2) readily fall into a compatible state, and an excellent heat storage material composition is formed. The reaction time is usually about 0.2 hour to 1 hour.

To the heat storage material composition, of the present invention, one or a mixture of two or more highly thermally conductive fillers such as metals such as copper, iron, zinc, beryllium, magnesium, cobalt, nickel, titanium, zirconium, molybdenum, tungsten, boron, aluminum, gallium, silicon, germanium, and tin, and their alloys or metal compounds containing these metal elements (for example, metal oxides, metal nitrides, metal carbides, and metal phosphides), and graphites, for example, flake graphite, vein graphite, amorphous graphite, and fibrous graphite may be added in order to improve the thermal efficiency of the heat storage material.

The amount of the aforementioned metals, alloys, metal compounds or graphites added is usually 0.1 to 100 parts by weight when the total of the Component (A), the Polymer (B-1) and the Polymer (B-2) to be subjected to heat-treatment is 100 parts by weight.

The heat storage material composition of the present invention may further contain additives such as inorganic fillers (for example, talc, calcium carbonate and calcined kaolin), organic fillers (for example, organic fiber, wood flour and cellulose powder), antioxidants (for example, phenolic antioxidants, sulfur-based antioxidants, phosphorus-based antioxidants, lactone-based antioxidants and vitamin-based antioxidants), weathering stabilisers, ultraviolet absorbers (e.g., benzotriazole ultraviolet absorbers, tridiamine-based ultraviolet absorbers, anilide-based ultraviolet absorbers and benzophenone-based ultraviolet absorbers), heat stabilizers, light stabilizers (for example, hindered amine light stabilizers and benzoate-based light stabilizers), antistatic agents, nucleating agents, pigments, hydrotalcite, aluminates, lubricants (e.g., fatty acids, higher alcohols, aliphatic amides and aliphatic esters) and silicone compounds.

The aforementioned additives may be pre-blended with at least one component of the Component (A), the Polymer (B-1), the Polymer (B-2), and the Component (C) mixed if necessary. Also, they may be blended after heating and mixing the Component (A), the Polymer (B-1), the Polymer (B-2) and the Component (C) mixed if necessary, or they may be blended in the heating and mixing.

The amount of the additives is usually 0.01 to 10 parts by weight when the total of the Component (A), the Polymer (B-1) and the Polymer (B-2) is 100 parts by weight.

The heat storage material composition of the present invention is excellent in fluidity during molding and allows the heat storage material to exhibit a reduced bleeding property. Hence, use thereof in a variety of fields such as air conditioning equipment in residences, hotels, airports and underground shopping centers, warm air systems of automobiles, electronic components, road reflecting mirrors, and concrete material of bridges can be expected.

In the case of an automotive warm air system, the heat storage material composition of the present invention can be applied to a heat storage device using a latent heat storage material capable of storing heat in its super-cooled state in order to effectively warm-up the internal combustion engine of the automobile, for example.

In the case of an electronic component, the heat storage material composition of the present invention can be used by being stuck on a housing surrounding the heating element of the electronic component to be mounted on electronic devices, for example. Examples of attachment points include sites that require heat shielding, such as electronic devices such as personal computers, tablet PCs, PDAs, mobile phones, and digital cameras, information devices such as printers, copiers, and projectors, and cooking appliances such as hot water dispensers, microwave ovens and water heaters.

EXAMPLES

The present invention will be described in more detail below by examples and comparative examples.
[I] Physical Properties Evaluation Methods
(1) Shape Retention
After leaving a specimen prepared by compression molding, in a gear oven at 100° C. for 24 hours, the specimen was rated as "o" if shape change, such as cracking and shrinkage, was not observed in the test, piece or was rated as "x" if shape change was observed.
(2) Bleed Resistance
After leaving a specimen prepared by compression, molding, in a gear oven at 100° C. for 24 hours, the specimen was rated as "o" if a heat storage material component did not bleed on the surface of the test piece or was rated as "x" if a heat storage material component bled.
[II] Raw Materials
Polyhydric Alcohol (A)
A-1: Trimethylolethane [Manufactured by Wako Pure Chemical Industries, Ltd.] (Molecular weight=120)
A-2: Meso-erythritol [Manufactured by Tokyo Chemical Industry Co., Ltd.] (Molecular weight=122)
A-3: Trimethylolaminomethane [Manufactured by Tokyo Chemical Industry Co., Ltd.] (Molecular weight=121)
Polymer (B-1)
B-1-1: Polyacrylic acid [Manufactured by Wako Pure Chemical industries, Ltd., weight average molecular weight: about 1,000,000]
Polymer (B-2)
B-2-1: Polyvinyl alcohol [Manufactured by Wako Pure Chemical Industries, Ltd., average degree of polymerization: 1,500 to 1,800, and degree of saponification: 78 to 82 mol %]
Thermoplastic Resin (C)
C-1: Ethylene-vinyl acetate copolymer KA-40 [Manufactured by Sumitomo Chemical Co., Ltd.]
C-2: Nylon 6 UBE NYLON 5033B [Manufactured by Ube Industries Co., Ltd.]

Example 1

A-1 (90 parts by weight), B-1-1 (2 parts by weight), and B-2-1 (8 parts by weight) were uniformly mixed at 200° C. for 5 minutes, affording a heat storage material composition. Furthermore, by compression molding the heat storage material composition at 210° C., a specimen having a thickness of 1 mm was prepared, and the physical properties thereof were measured. The results are shown in Table 1.

Example 2

A heat storage material composition was prepared in the same manner as in Example 1 except that C-1 (10 parts by weight) was added. The results are shown in Table 1.

Example 3

A heat storage material composition was prepared in the same manner as in Example 1 except that C-2 (10 parts by weight) was added. The results are shown in Table 1.

Example 4

A heat storage material composition was prepared in the same manner as in Example 1, except that A-2 was used instead of A-1, and the temperature during mixing was set to 140° C. Further, by compression molding the heat storage material composition at 140° C., a specimen having a thickness of 1 mm was prepared, and the physical properties thereof were measured. The results are shown in Table 1.

Example 5

A heat storage material composition was prepared in the same manner as in Example 1, except that A-3 was used instead of A-1, and the temperature during mixing was set to 175° C. Further, by compression molding the heat storage material, composition at 175° C., a specimen having a thickness of 1 mm was prepared, and the physical properties thereof were measured. The results are shown in Table 1.

Comparative Example 1

By compression molding A-1 (100 parts by weight) at 210° C., a specimen having a thickness of 1 mm was prepared, and the physical properties thereof were measured. The results are shown in Table 1.

Comparative Example 2

By compression molding A-2 (100 parts by weight) at 140° C., a specimen having a thickness of 1 mm was prepared, and the physical properties thereof were measured. The results are shown in Table 1.

TABLE 1

|  |  | Example | | | | | Comparative Example | |
| --- | --- | --- | --- | --- | --- | --- | --- | --- |
|  |  | 1 | 2 | 3 | 4 | 5 | 1 | 2 |
| Composition | | | | | | | | |
| A-1 | Parts by weight | 90 | 90 | 90 | | | 100 | |
| A-2 | Parts by weight | | | | 90 | | | 100 |
| A-3 | Parts by weight | | | | | 90 | | |
| B-1-1 | Parts by weight | 2 | 2 | 2 | 2 | 2 | | |
| B-2-1 | Parts by weight | 8 | 8 | 8 | 8 | 8 | | |
| C-1 | Parts by weight | | 10 | | | | | |
| C-2 | Parts by weight | | | 10 | | | | |
| Evaluation results | | | | | | | | |
| Shape retention | | o | o | o | o | o | x | x |
| Bleed resistance | | o | o | o | o | o | o | x |

INDUSTRIAL APPLICABILITY

According to the present invention, it is possible to provide a heat storage material composition having excellent shape retention and bleed resistance.

The invention claimed is:
1. A heat storage material composition obtained by heat-treating Component (A) being a polyhydric alcohol not having constitutional units derived from any vinyl monomers, Polymer (B-1) and Polymer (B-2) together, wherein:
Polymer (B-1) is a polymer composed mainly of constitutional units derived from acrylic acid or a salt thereof, a polymer composed mainly of constitutional units derived from methacrylic acid or a salt thereof, or a mixture thereof, and excluding a polymer having two or more hydroxy groups in one polymer chain; and

Polymer (B-2) is a polymer composed mainly of constitutional units derived from a vinyl monomer and having two or more hydroxy groups in one polymer chain,
wherein a total amount of the Polymer (B-1) and the Polymer (B-2) is 1 to 40 parts by weight and the amount of the Component (A) is 60 to 99 parts by weight with respect to a total of 100 parts by weight of the Component (A), the Polymer (B-1), and the Polymer (B-2).

2. The heat storage material composition according to claim 1, wherein the amount of the Polymer (B-1) to be subjected to the heat-treatment is 0.1 to 40 parts by weight, and the amount of the Polymer (B-2) to be subjected to the heat-treatment is 0.1 to 40 parts by weight with respect to 100 parts by weight of a total of the Component (A), the Polymer (B-1) and the Polymer (B-2) to be subjected to the heat-treatment.

3. The heat storage material composition according to claim 1, wherein the Component (A) is a polyhydric alcohol represented by the following formula (1), a polyhydric alcohol represented by the following formula (2), or a mixture thereof,

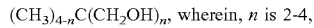   Formula (1):

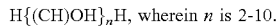   Formula (2):

4. The heat storage material composition according to claim 1, wherein the Polymer (B-1) is polyacrylic acid, polymethacrylic acid, or a mixture thereof, and the Polymer (B-2) is polyvinyl alcohol.

5. The heat storage material composition according to claim 1, further containing 0.1 to 100 parts by weight of a thermoplastic resin (C) with respect to a total of 100 parts by weight of the Component (A), the Polymer (B-1) and the Polymer (B-2) to be subjected to the heat-treatment.

6. The heat storage material composition according to claim 5, wherein the thermoplastic resin (C) is selected from:
   (1) homopolymers of vinyl acetate, α-olefin-vinyl acetate copolymers,
   (2) homopolymers of acrylate, α-olefin-acrylate copolymers,
   (3) homopolymers of methacrylates, α-olefin-methacrylate copolymers,
   (4) homopolymers of acrylonitrile, copolymers of α-olefin and acrylonitrile,
   (5) homopolymers of vinyl chloride or vinylidene chloride, α-olefin-vinyl chloride copolymers, α-olefin-vinylidene chloride copolymers,
   (6) homopolymers of styrene or α-methylstyrene, α-olefin-styrene copolymers, α-olefin α-styrene copolymers,
   (7) high-impact polystyrene, styrene-acrylonitrile copolymers, acrylonitrile-butadiene-styrene copolymers, acrylonitrile-ethylene-styrene copolymers, acrylonitrile-styrene-acrylate copolymers, chlorinated polyethylene-acrylonitrile-styrene copolymers,
   (8) polyesters,
   (9) polycarbonates,
   (10) polyamides,
   (11) polyamideimides, polyether imides, polyimides, polyurethanes, and
   (12) cellulose derivatives.

7. A molded article comprising the heat storage material composition according to claim 1.

* * * * *